(12) United States Patent
Uchiyama et al.

(10) Patent No.: US 6,624,366 B2
(45) Date of Patent: Sep. 23, 2003

(54) LEVER SWITCH FOR VEHICLE

(75) Inventors: Norio Uchiyama, Tokyo (JP); Toshiaki Yokoyama, Tokyo (JP)

(73) Assignee: Niles Parts Co., Ltd., Tokyo (JP)

( * ) Notice: Subject to any disclaimer, the term of this patent is extended or adjusted under 35 U.S.C. 154(b) by 0 days.

(21) Appl. No.: 10/270,588

(22) Filed: Oct. 16, 2002

(65) Prior Publication Data

US 2003/0079975 A1 May 1, 2003

(30) Foreign Application Priority Data

Oct. 17, 2001 (JP) ..................... P2001-319283

(51) Int. Cl.[7] ................................................. H01H 9/00
(52) U.S. Cl. ................. 200/61.54; 200/61.27; 200/61.35; 200/335
(58) Field of Search ................. 200/61.54, 61.58, 200/61.27, 61.31, 61.33, 61.35, 61.36, 332, 335

(56) References Cited

U.S. PATENT DOCUMENTS

| | | | | |
|---|---|---|---|---|
| 5,440,085 A | * | 8/1995 | Suzuki et al. | 200/61.54 |
| 5,701,660 A | * | 12/1997 | Javery et al. | 29/622 |
| 5,920,047 A | * | 7/1999 | Akimoto et al. | 200/61.54 |
| 5,936,215 A | * | 8/1999 | Masuda et al. | 200/61.3 |
| 6,114,640 A | * | 9/2000 | Oddo et al. | 200/61.27 |
| 6,462,290 B1 | * | 10/2002 | Matsumoto | 200/61.54 |

* cited by examiner

*Primary Examiner*—Lincoln Donovan
*Assistant Examiner*—K. Lee
(74) *Attorney, Agent, or Firm*—Rader, Fishman & Grauer PLLC

(57) ABSTRACT

A lever switch for a vehicle which is easy to assemble is disclosed, which includes a control lever 50 having switches at the end, a swing block 24 rotatably retaining the control lever, and a casing 1 rotatably retaining the swing block together with the control lever, for allowing the control lever 50 to be rotatably retained in two intersecting planes, a rotating shaft 24a is formed on the lower end face 24f of the swing block 24, the rotating shaft is fitted in a shaft hole 1c formed in a support surface A of the casing to retain the swing block 24 rotatably, a recessed portion 24b communicating with the control lever is formed in the outer peripheral face of the rotating shaft 24a through the lower end face supporting the rotating shaft. Wire leads 11 jutting from the switches are led to the lower part of the casing 1 through the recessed portion 24b, thus facilitating assembly as compared with a structure of wiring through a through-hole 24c at the center of the rotating shaft.

5 Claims, 5 Drawing Sheets

(a)

(b)

(a)

(b)

LEVER SWITCH FOR VEHICLE

BACKGROUND OF THE INVENTION

1. Field of the Invention

The present invention relates to a lever switch for a vehicle, and particularly to that easy to assemble.

2. Description of Related Art

Lever switches for vehicles adopt, for example, a structure shown in FIGS. 5 and 6. FIG. 5 is a partially sectional view thereof and FIG. 6 is an exploded perspective view of essential parts thereof.

A control lever 50 includes an operating section 51 formed extending from a shaft base 6f having rotating shafts 6d on both sides. More specifically, it has a triple structure having a second lever 6 extending from a shaft base 6f, and a cylindrical first lever 3 on the outside and a third lever 22 on the inside with the second lever 6 centered, each of which can rotate about the second lever 6.

The rotating shafts 6d on both sides of the shaft base 6f are fitted in respective shaft holes 35d formed in both sidewalls of a swing block 35, and the control lever 50 is rotatably retained around the rotating shaft 6d by the swing block 35.

An extension portion 6e extending in the opposite direction from the second lever 6 is provided at the shaft base 6f. The extension portion 6e holds a ball 26 biased by a spring 25 and pushes it to a cam 35b of the swing block 35. The ball 26 and the cam 35b constitute a click mechanism of the control lever 50.

The swing block 35 has a rotating shaft 35a at the bottom wall and a rotating shaft 35e on the upper wall, as shown in FIG. 6. The rotating shaft 35a is fitted in a shaft hole 1c formed in a support surface A of a casing 1, and the rotating shaft 35e is fitted in a shaft hole of a cover 1A covering the casing 1, respectively, which are retained in the casing 1 together with the retained control lever 50 such that they can be rotated about the rotating shaft 35a.

A pole plate 10 is mounted under the support surface A of the casing 1, and has a turn signal switch, a headlight selection switch, a windshield wiper switch, and a washer switch thereon.

A contact surface abutting on a contact portion 27b of an arm 27 supported by the casing 1 is formed on the lower surface of the extension portion 6e at the end of the shaft base 6f. A pushing portion 27c is slid vertically by rotating the control lever 50 vertically (in the plane parallel to the paper in FIG. 5) to move a moving part 29 biased by a spring 28, thereby switching the headlight selection switch.

The end of the third lever 22 passing through the second lever 6 is connected to a rotating knob 4 adjacent to the first lever 3, shown in FIG. 6, at the inner end of which an operating rod 22a shaped like a gearwheel is provided. The operating rod 22a is engaged with a moving part 34 of the wiper switch, which is rotatably supported by a substrate 32 mounted to the pole plate 10 through a through-hole 35c at the center of the rotating shaft 35a of the swing block 35. When the rotating knob 4 is rotated, the moving part 34 is rotated to switch the wiper switch.

The first lever 3 is rotatably supported by the second lever 2, at the inner end of which an operating rod (not shown) is provided at the back of the operating rod 22a. The end of the operating rod is brought into contact with a moving part of the washer switch, and the washer switch is switched by rotating the first lever 3.

When the control lever 50 is rotated back and forth (in the plane perpendicular to the paper in FIG. 5), the turn signal switch (not shown) is switched.

A switch for operating, for example, a constant speed controller is provided in, and also a slide knob 16 and a push button 17 for operating it are provided at the end of the control lever 50.

The switches and the vehicle are connected by wire leads 11. The wire leads 11 taken out near the shaft base 6f of the control lever 50 through a gap formed between the first lever 3 and the second lever 6 are passed through the through-hole 35c of the swing block 35, as shown in FIG. 5B, are then passed through the shaft hole 1c in the support surface A, are then led out of the casing 1, and connected to the vehicle. FIG. 5B is a sectional view of the rotating shaft 35a, seen from the support surface A of the casing 1.

In the conventional lever switch for a vehicle, however, during assembly, when the shaft base 6f of the second lever 6 is mounted to the swing block 35 and they are then assembled into the casing 1, the wire leads 11 must be passed through the through-hole 35c of the swing block 35 in advance. Accordingly, a process for passing the wire leads 11 into the through-hole 35c is needed, thus increasing man-hours.

Particularly when a connector attached to each end of the wire leads is larger than the through-hole 35c, first, only the wire-lead main body must be passed, and after assembly, the connector must be mounted, further increasing man-hours and resulting in inefficient production.

SUMMARY OF THE INVENTION

Accordingly, in consideration of the above conventional problems, it is an object of the present invention to provide a lever switch for a vehicle facilitating assembly and achieving efficient production.

To this end, according to the present invention of claim 1, in a lever switch for a vehicle comprising a control lever in which switches are housed in an operating section thereof, a swing block, and a casing, the control lever being rotatably retained by the swing block, the swing block having a rotating shaft formed on the bottom wall thereof, the rotating shaft being fitted in a shaft hole of the casing to be supported by the casing, and the control lever being allowed to rotate in two intersecting planes with respect to the casing, a recessed portion communicating with the control lever is formed in the outer peripheral face of the rotating shaft or the inner peripheral face of the shaft hole.

Since space is formed between the rotating shaft and the shaft hole by forming the recessed portion in the outer peripheral face of the rotating shaft or the inner peripheral face of the shaft hole, the wire leads jutting from the switches can be fitted in this recessed portion to pass through the lower part of the casing.

The recessed portion can be formed, in the rotating shaft for example, extending from the upper end face of the bottom wall to the lower end face of the rotating shaft.

According the present invention of claim 3, the recessed portion has a retaining section for retaining the wire leads.

Since the retaining section is provided, the lever switch can be assembled with the wire leads retained in the recessed portion, thus improving workability during assembly.

The retaining section can be constituted by tongue pieces formed extending from, for example, an opening of the recessed portion as part of the rotating shaft. The tongue pieces retain the wire leads mounted in the recessed portion.

The retaining section can also be constituted by a plurality of grooves formed in parallel with the recessed portion in the recessed portion.

In this case, the wire leads can easily be retained in the recessed portion by press fitting the wire leads in the grooves.

DESCRIPTION OF THE PREFERRED EMBODIMENTS

An embodiment of the present invention will be described hereinbelow with reference to the drawings.

Figure 1:
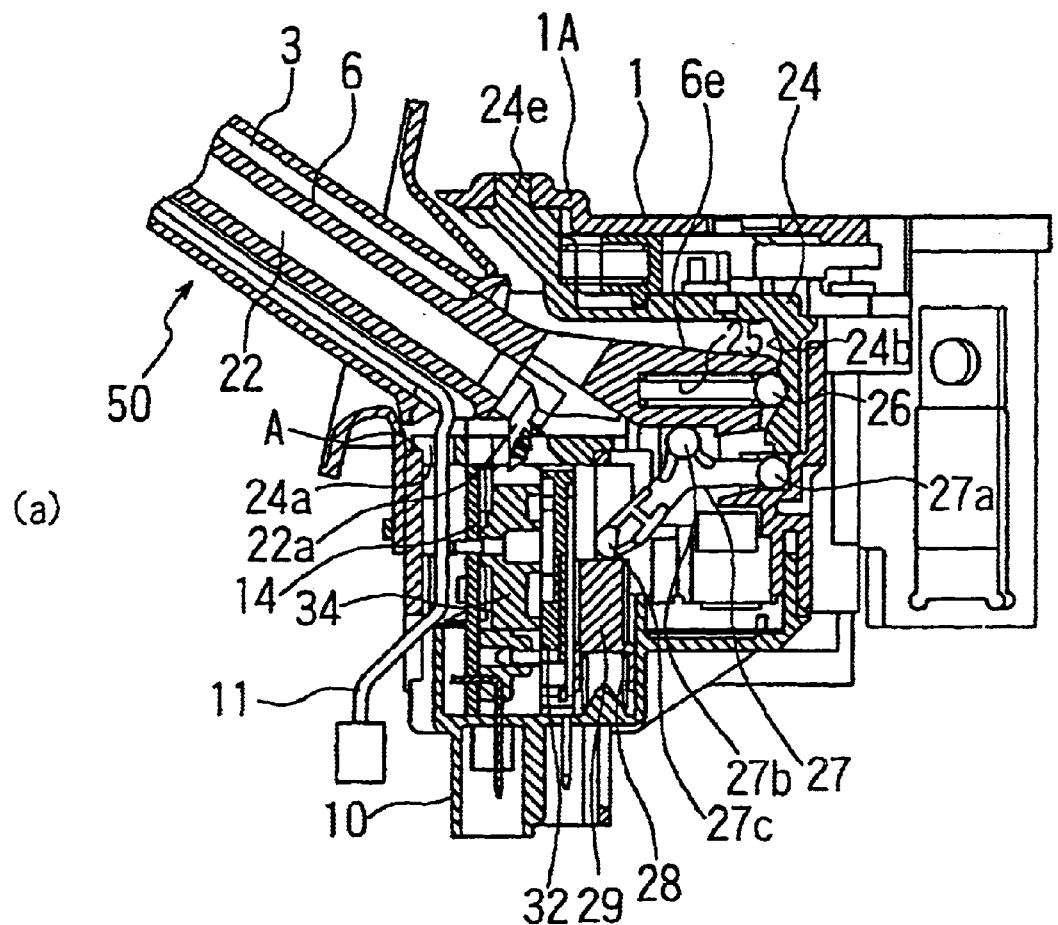
FIG. 1 is a sectional view showing a structure of an embodiment.
Figure 1:
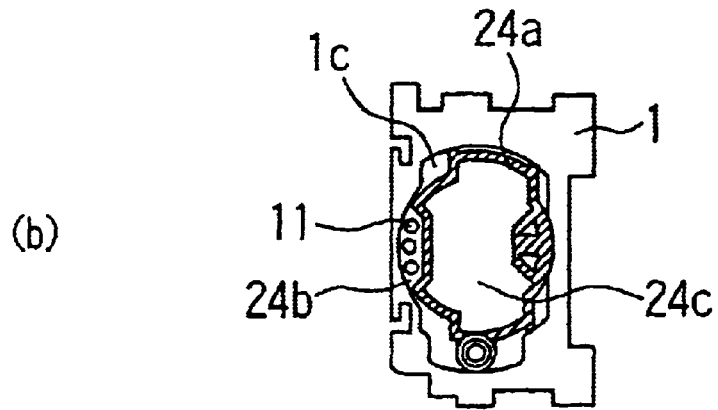
Figure 2:
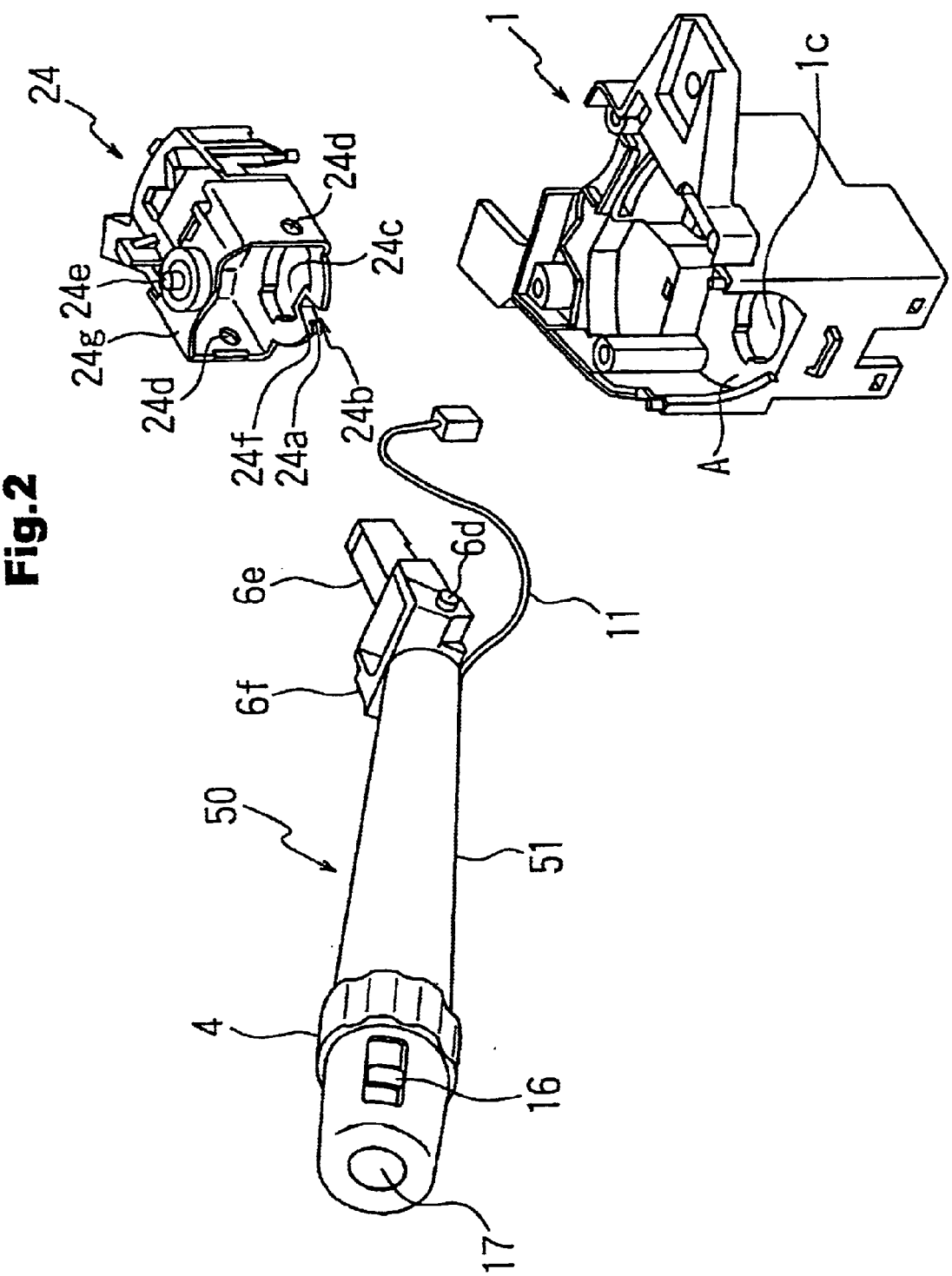
FIG. 2 is an exploded perspective view of essential parts of the embodiment.

FIG. 1 is a sectional view showing a structure of a lever switch for a vehicle. FIG. 2 is an exploded perspective view of essential parts of the same. In the embodiment, the same parts as the components described in the prior art are denoted by the same reference numerals and symbols.

As shown in FIG. 1, the control lever 50 has a triple structure in which a cylindrical first lever 3 is provided on the outside and a third lever 22 is provided on the inside, with a second lever 6 centered thereof, and they can be rotated about the second lever.

The second lever 6 includes a shaft base 6f, at the end of which an extension portion 6e extending in the opposite direction from the second lever 6 is formed.

A swing block 24 has a rotating shaft 24a at a bottom wall 24f thereof and a rotating shaft 24e on an upper wall 24g thereof. The rotating shaft 24a is fitted in a shaft hole 1c formed in a support surface A of a casing 1, and the rotating shaft 24e is fitted in a shaft hole of a cover 1A covering the casing 1, respectively, which are retained together with the retained control lever 50 such that they can be rotated about the rotating shaft 24a.

A pole plate 10 is mounted under the support surface A of the casing 1. The pole plate 10 has a headlight selection switch, a windshield wiper switch, a washer switch, and a turn signal switch (not shown) thereon.

The headlight selection switch is switched by turning the control lever 50 vertically on the paper.

The turn signal switch can be switched when the control lever 50 is turned perpendicularly to the paper.

The windshield wiper can be switched by rotating a rotating knob 4.

The washer switch can be switched when the third lever 22 is rotated.

A switch for operating, for example, a constant speed controller is provided in, and also a slide knob 16 and a push button 17 for operating it are provided at the end of the second lever 6. The above structure is the same as that of the conventional art.

In the conventional art, a wire lead 11 jutting from the switch for operating the constant speed controller is led under the casing 1 through a through-hole 24c of the swing block 24. On the other hand, in this embodiment, there is no need to pass it through the through-hole 24c.

In other words, the rotating shaft 24a of the swing block 24 has a recessed portion 24b in the peripheral face thereof. The recessed portion 24b extends from the upper end face of the bottom wall 24f supporting the rotating shaft 24a to the lower end face of the rotating shaft 24a. In this manner, a passage communicating between the second lever 6 and the lower part of the casing 1 is formed.

In a state in which the swing block 24 is mounted in the casing 1, space is formed between the moving shaft 24a and the shaft hole 1c, as shown in FIG. 1B, so that the wire lead 11 jutting from the switch for operating the constant speed controller can be wired to the lower part of the casing 1 through the recessed portion 24b.

FIG. 1B is a sectional view of the recessed portion 24b, with the rotating shaft 24a cut, seen from the support surface A of the casing 1.

In assembly, a rotating shaft 6d at the shaft base 6f of the second lever 6 is fitted in a shaft hole 24d of the swing block 24 to mount the control lever 50 to the swing block 24; the wire lead 11 is then passed through the shaft hole 1c with the tip of the wire lead 11 ahead and the wire lead 11 fitted in the recessed portion 24b; and the swing block 24 is then mounted to the casing 1. Finally, the cover 1A is mounted to the casing 1, and thus the lever switch for a vehicle can be assembled.

When the swing block 24 is rotated around the rotating shaft 24a by operating the control lever 50, the position of the recessed portion 24b relative to the shaft hole 1c of the casing 1 changes. However, the space for housing the wire lead can be kept; thus the wire lead 11 does not obstruct the rotation of the swing block 24 and is not cut off.

This embodiment is constructed as described above, wherein forming the recessed portion 24b extending from the upper end face of the bottom wall to the lower end face of the rotating shaft 24a and on the peripheral face of the rotating shaft 24a eliminates the need to wire the wire lead 11 through the through-hole 24c in the swing block 24, simplifying the mounting operation as compared with the conventional art in which after the wire lead has been passed through the through-hole 24c of the swing block 24, the control lever 50 is mounted, thereby reducing man-hours.

Also, even when the connector is large, there is no need to pass it through the through-hole 24c. Therefore, there is also no need to pass only the main body of the wire lead 11 and mount the connector after assembly, thus obtaining an advantage of achieving efficient assembly.

While a structure in which the recessed portion is formed on the side of the rotating shaft is shown, it may be formed in the inner peripheral face of the shaft hole 24d to be fitted on the rotating shaft.

Next, a modification will be described.

Figure 3:
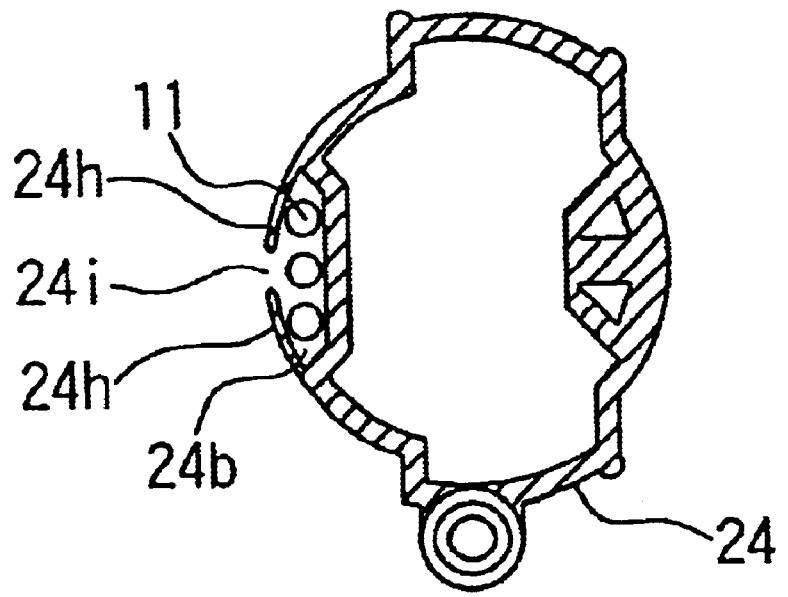
FIG. 3 is a diagram of a modification.

In the above-described embodiment, the recessed portion 24b formed in the outer peripheral face of the rotating shaft 24a is opened in the peripheral face; however, in the modification, tongue pieces 24h are extended from both sides of an opening of the recessed portion 24b as part of the rotating shaft, and a gap 24i smaller than the diameter of the wire lead 11 is formed at the center of the opening, as shown in FIG. 3.

Accordingly, the wire lead 11 can be mounted into the recessed portion 24b through the gap 24i, and also the wire lead 11 can be retained in the recessed portion 24b with the tongue pieces 24h, thus further improving workability during assembly.

Figure 4:
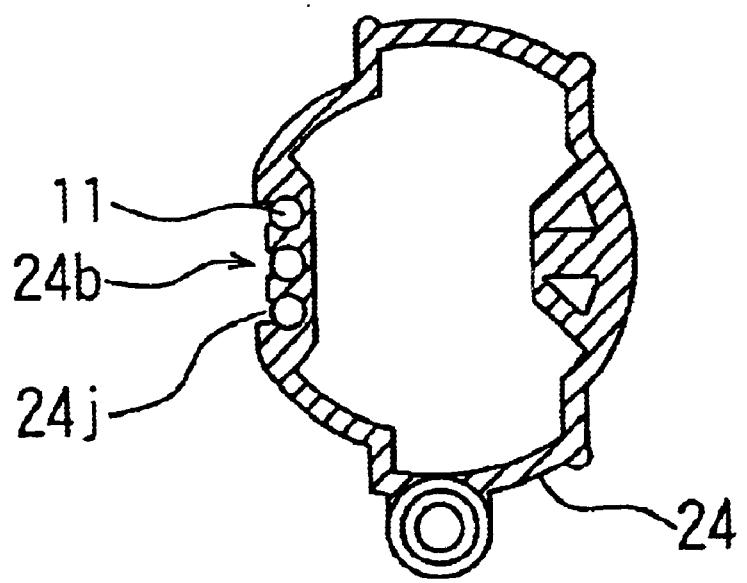
FIG. 4 is a diagram of another modification.
Figure 5:
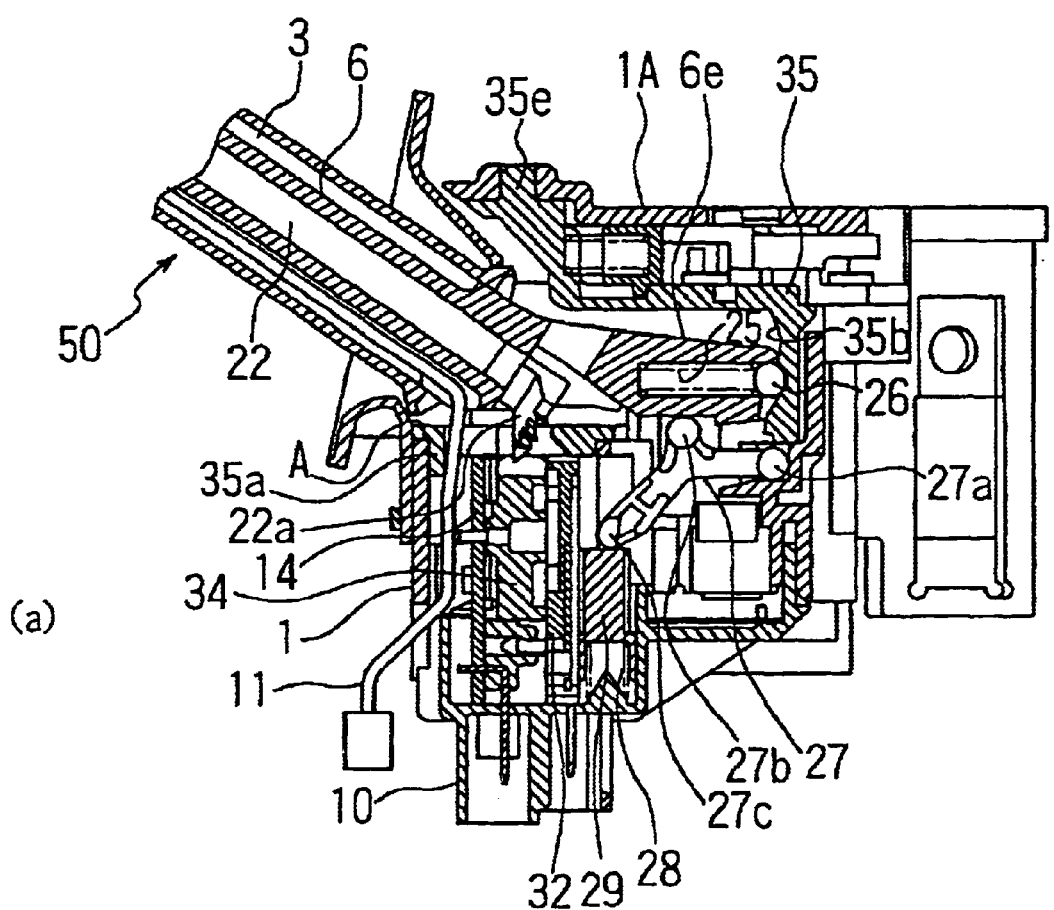
FIG. 5 is a sectional view showing a structure of a conventional art.
Figure 5:
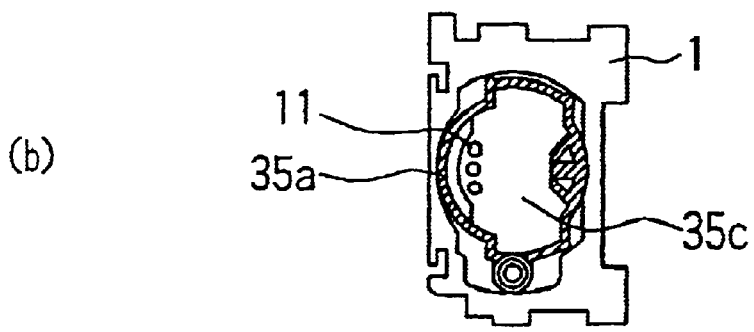
Figure 6:
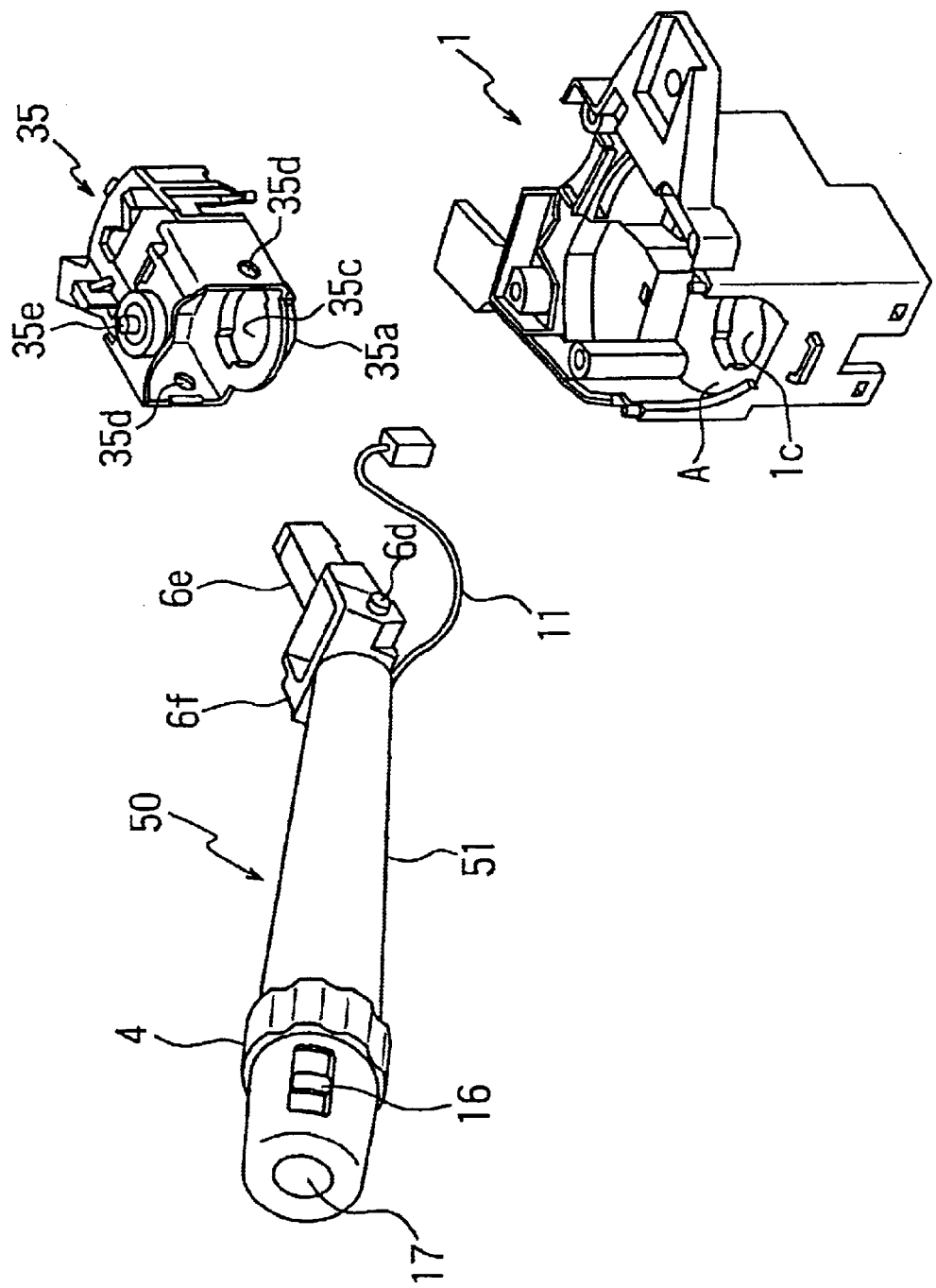
FIG. 6 is an exploded perspective view of essential parts of the conventional art.

Also, as shown in FIG. 4, grooves 24j of the same number as the wire leads 11 are formed along the recessed portion 24b on the bottom thereof. The inlet of each groover 24j is formed slightly smaller than the wire lead 11. Therefore, when each wire lead 11 is press fitted into the groove 24j, it can be retained in the recessed portion 24b. In this case as well, work lines for assembly can be improved.

Thee tongue pieces and grooves constitute the retaining section.

As described above, a recessed portion communicating with a control lever is formed in an outer peripheral face of a rotating shaft of a swing block or an inner peripheral face of a shaft hole to be fitted on the rotating shaft. Consequently, wire leads jutting from switches provided at the end of the control lever have only to be passed through a shaft hole formed in a support surface of a casing, omitting the work to pass the wire leads through a through-hole formed in a swing block, as compared with the conventional art in which after each wire lead have been passed through the through-hole, they are passed through the shaft hole, thus obtaining an advantage of decreasing man-hours.

Since there is no need to pass each wire lead through the through-hole, there is also no need to pass only the wire-lead main body through the through-hole in advance and then mount the connector after assembly because it is impossible to pass it therethrough, thus improving workability.

The recessed portion is provided with a retaining portion; therefore, the wire leads can be retained in the recessed portion, thereby further improving workability during assembly.

When the retaining section retains the wire leads mounted in the recessed portion with tongue pieces formed extending from an opening of the recessed portion as part of the rotating shaft, the wire leads can be retained only by mounting them through a gap formed by the tongue pieces.

When the recessed portion is provided with grooves for retaining the wire leads, the wire leads can easily be retained by press fitting them into the grooves.

What is claimed is:

1. A lever switch for a vehicle comprising a control lever in which switches are housed in an operating section thereof, a swing block, and a casing, the control lever being rotatably retained by said swing block, said swing block having a rotating shaft formed on the bottom wall thereof, the rotating shaft being fitted in a shaft hole of said casing to be supported by the casing, and said control lever being allowed to rotate in two intersecting planes with respect to said casing, wherein:

a recessed portion communicating with said control lever is formed in the outer peripheral face of said rotating shaft or the inner peripheral face of said shaft hole.

2. A lever switch for a vehicle of claim 1, wherein said recessed portion is formed in said rotating shaft and extends from the upper end face of said bottom wall to the lower end face of said rotating shaft.

3. A lever switch for a vehicle of claim 2, wherein said recessed portion has a retaining section for retaining wire leads.

4. A lever switch for a vehicle of claim 3, wherein said retaining section is constituted by tongue pieces formed at an opening of said recessed portion, extending as part of said rotating shaft.

5. A lever switch for a vehicle of claim 3, wherein said retaining section is constituted by a plurality of grooves formed in parallel with said recessed portion in the recessed portion.

* * * * *

UNITED STATES PATENT AND TRADEMARK OFFICE
CERTIFICATE OF CORRECTION

PATENT NO.     : 6,624,366 B2                                            Page 1 of 1
DATED          : September 23, 2003
INVENTOR(S)    : Norio Uchiyama et al.

It is certified that error appears in the above-identified patent and that said Letters Patent is hereby corrected as shown below:

<u>Title page,</u>
Item [57], ABSTRACT,
Line 3, replace "end, a swing block" with -- end thereof, a swing block --.

Signed and Sealed this

Twenty-fifth Day of November, 2003

JAMES E. ROGAN
*Director of the United States Patent and Trademark Office*